No. 799,878. PATENTED SEPT. 19, 1905.
W. S. STOCKWELL.
SURVEYING INSTRUMENT.
APPLICATION FILED NOV. 23, 1904.
3 SHEETS—SHEET 1.
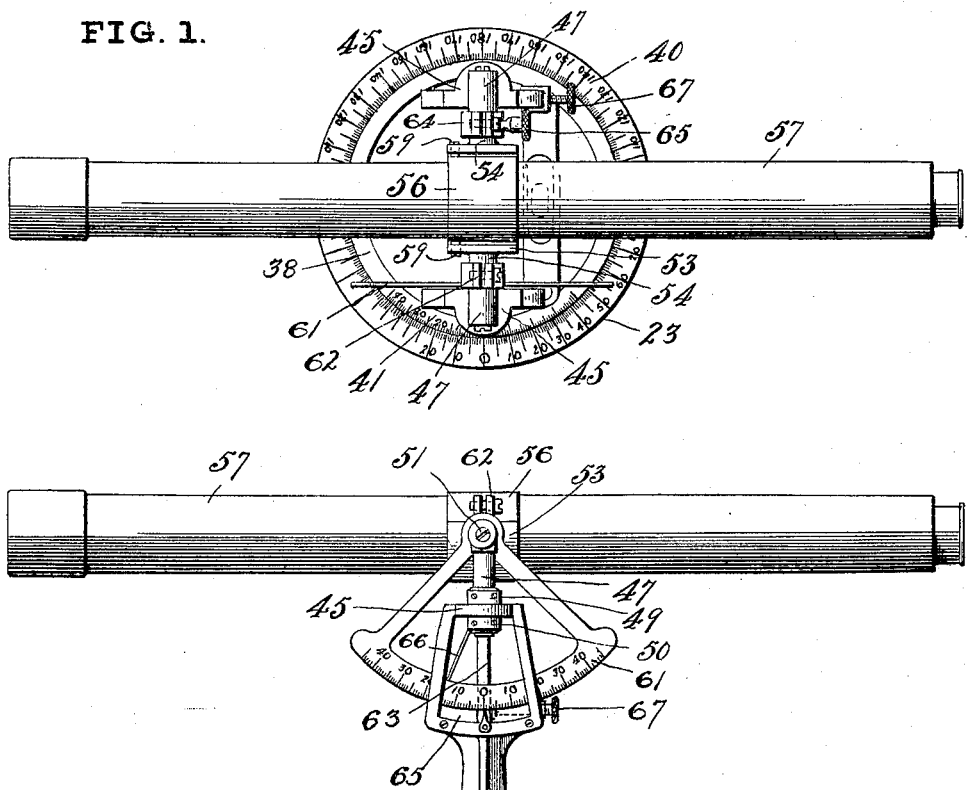
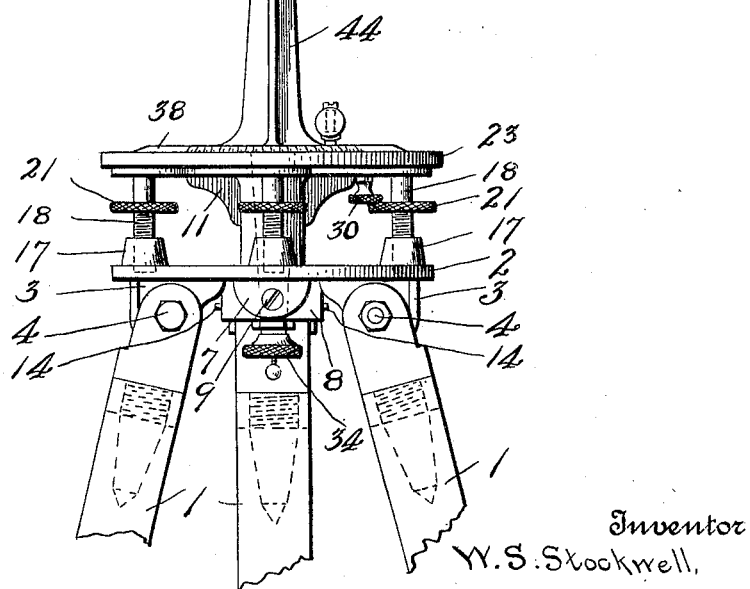

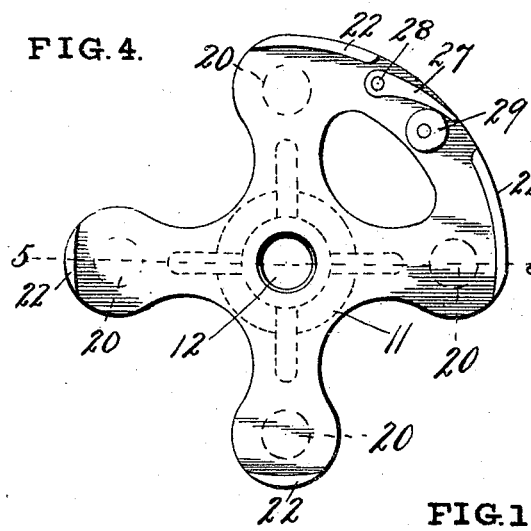
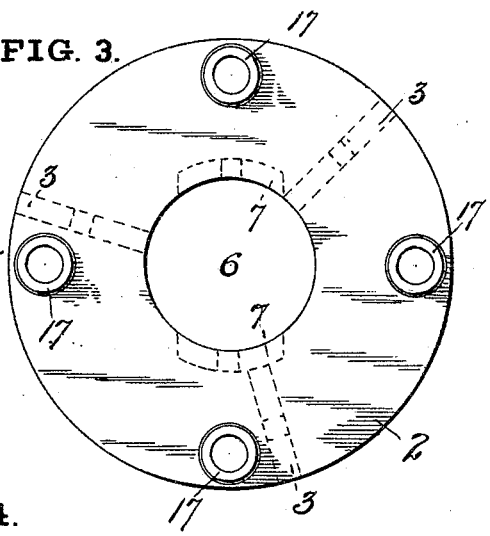
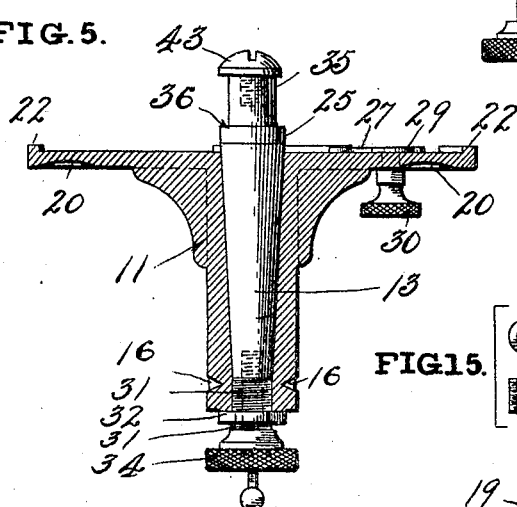
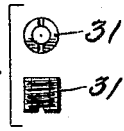
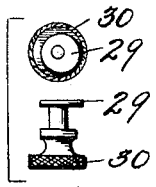
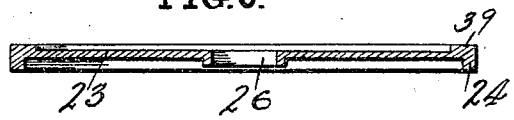
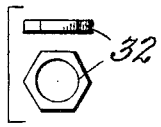

No. 799,878. PATENTED SEPT. 19, 1905.
W. S. STOCKWELL.
SURVEYING INSTRUMENT.
APPLICATION FILED NOV. 23, 1904.
3 SHEETS—SHEET 3.
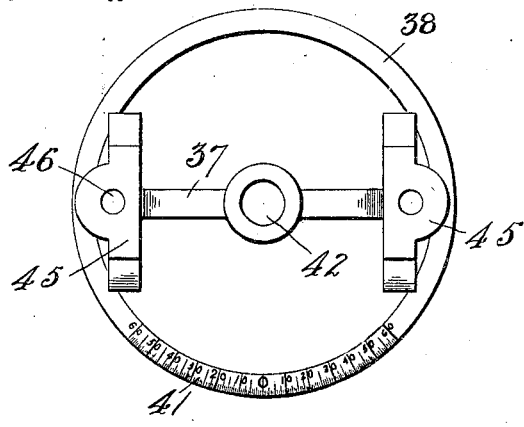
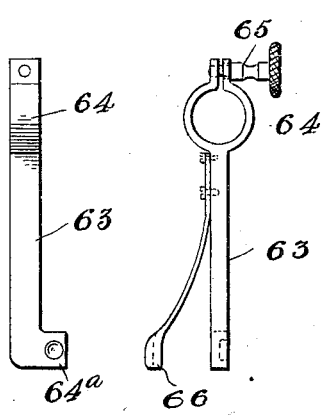
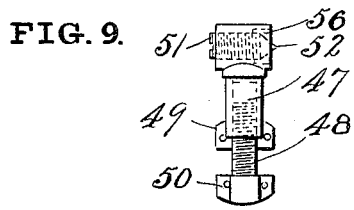
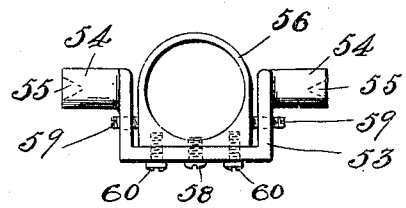
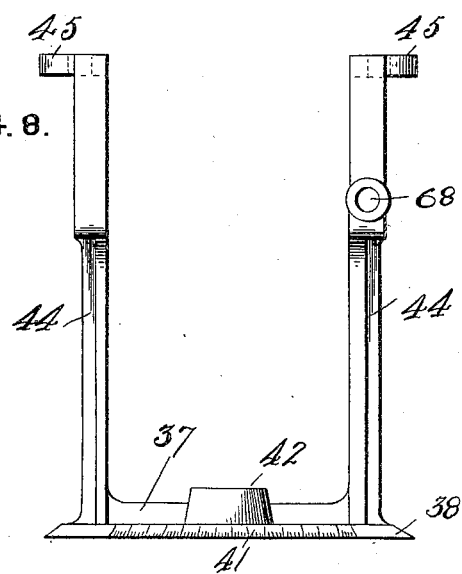
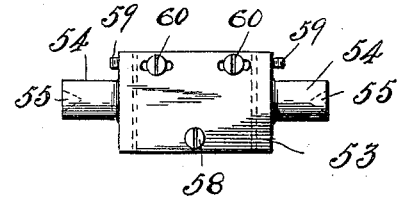
Witnesses
Chas K Davies
L L Morrill
Inventor
W. S. Stockwell
by Shepherd & Parker
Attorneys

UNITED STATES PATENT OFFICE.

WINFIELD S. STOCKWELL, OF ATHOL, MASSACHUSETTS.

SURVEYING INSTRUMENT.

No. 799,878.     Specification of Letters Patent.     Patented Sept. 19, 1905.

Application filed November 23, 1904. Serial No. 234,061.

*To all whom it may concern:*

Be it known that I, WINFIELD S. STOCKWELL, a citizen of the United States, residing at Athol, in the county of Worcester and State of Massachusetts, have invented certain new and useful Improvements in Surveying Instruments, of which the following is a specification.

My invention relates to surveying instruments, particularly transits, and has for its objects to improve the construction of instruments of this character by rendering them capable of more exact adjustment and at the same time to lessen the cost of their manufacture.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a top plan view of my improved surveying instrument. Fig. 2 is a view of the instrument in side elevation. Fig. 3 is a top plan view of the base-plate. Fig. 4 is a top plan view of the spindle-socket and circle-supporting member. Fig. 5 is a vertical sectional view of the spindle-socket and circle-supporting member, taken on line 5 5 of Fig. 4. Fig. 6 is a transverse sectional view of the graduated circle. Fig. 7 is a top plan view of the sight-tube-supporting frame, showing in top plan the circle provided with graduations adapted to serve as a vernier. Fig. 8 is a view of the sight-tube-supporting frame in side elevation and at right angles to the view of the said frame shown in Fig. 2. Fig. 9 is a view in elevation of the adjustable standard for mounting the sight-tube upon the supporting-frame. Fig. 10 is a detail side elevation of the lever for holding the sight-tube in a horizontal position. Fig. 11 is a view in end elevation of the same lever. Fig. 12 is a view in end elevation of the yoke adapted to support and the sleeve adapted to embrace the sight-tube. Fig. 13 is a bottom plan view of the sight-tube-supporting yoke, showing means for adjusting the sight-tube relative to the yoke. Fig. 14 is a detail view of the screw for fixing the spindle rigidly within the socket. Fig. 15 is an end view and side elevation of the hollow screw which serves as a bearing for the smaller end of the spindle. Fig. 16 is a detail side elevation of the screws used to adjust the graduated circle and vernier to an exact horizontal position. Fig. 17 is a top plan view and side elevation of the ring forming a universal joint between the base-plate and the socket member. Fig. 18 is a top plan view and side elevation of the cam and cam-operating device for locking the graduated circle, and Fig. 19 is a side elevation and top plan view of the nut for locking the spindle bearing-screw at the desired adjustment.

Like characters of reference designate corresponding parts throughout the several views.

In its preferred embodiment my surveying instrument is adapted to be mounted upon the usual tripod-legs 1 by means of a base-plate 2, provided with lugs 3 and bolts 4, passing through the legs and lugs. The base-plate 2 is provided with a central opening 6, upon opposite sides of which opening and on the lower side of the said plate 2 are formed lugs 7. Within the opening 6 is disposed ring 8, which is pivotally secured in said opening by pivot-screws 9, provided with points entering tapered holes 10 at diametrical points in the periphery of said ring 8. Within the ring is placed a socket member 11, provided with a tapered socket 12, extending longitudinally thereof and in which is disposed a tapered spindle 13, so disposed as to stand normally in a vertical position. The socket member 11 is held pivotally within ring 8 by pivot-screws 14 passing through said ring at diametrical points and each approximately ninety degrees from the adjacent opening 10. The pivot-screws 14 are provided with pivot-points 15, entering tapered holes 16 in the socket member.

The base-plate 2 is provided with upstanding bosses 17, screw-threaded internally and in which are disposed adjusting-screws 18. The adjusting-screws 18 are provided at their upper ends with a convex surface 19, engaging concavities 20 in the lower face of socket member 11. The adjusting-screws 18 are also provided with a knurled portion 21 for convenience in manipulation. The socket member 11 is provided at the extremities of its outstanding arms with upstanding bosses 22, upon which is disposed a disk 23, provided with a dependent flange 24, encircling the socket member 11. The disk 23 rests upon the bosses 22, which form a bearing-surface for the disk and hold said disk out of contact with the socket member 11, except at the said points. The spindle 13 is provided with a cylindrical continuation 25, passing through the opening 26, formed centrally of the disk 23 and forming a bearing upon which the said disk is free to rotate independently of the spindle. Secured to the socket member 11 and adjacent to its periphery is a lever 27, pivoted at 28 and capable of contact with the flange 24 of the disk 23. To manipulate said lever 27 an eccentric cam 29 is mounted adjacent to said lever and provided with a knurled head 30, extending below the outstanding plain surface of the socket member 11.

Within the lower end of the tapered socket 12 is disposed a hollow screw 31, forming a bearing for the lower end of the tapered spindle 13. A lock-nut 32 is placed upon said hollow screw 31 to retain said screw 31 at the desired vertical adjustment. The spindle 13 is provided at its smaller end with an axial screw-threaded opening. A screw 33, provided with a knurled head 34, is passed through the opening in bearing-screw 31 and engages the screw-threads in the end of spindle 13 to bind said spindle at any desired adjustment.

The spindle 13 is provided at its upper end with a reduced cylindrical portion 35, forming a shoulder 36 upon the cylindrical portion 25. The frame 37 is provided with a circular base 38, so proportioned as to be encircled by a flange 39, upstanding from disk 23. The flange 39 is provided with graduations, as shown at 40, and the circular base 38 is provided with graduations, as shown at 41, adapting the said circular base for use as a vernier in connection with the graduations 40 upon flange 39. The frame 37 is provided with an opening 42, located centrally of the circular base 38 and adapted to fit upon cylindrical portion 35 of the spindle 13 and to be secured thereon by a screw 43 within an opening formed axially within the upper end of the spindle 13. The frame 37 is provided with uprights 44, terminating at their upper ends in horizontally-disposed plane surfaces 45. The plane surfaces 45 are provided with openings 46, in which are disposed adjustable standards 47, provided with a screw-threaded portion 48 and adjusting-nuts 49 and 50, adapted to engage the upper and lower sides, respectively, of the plane surfaces 45. At its upper end the standard 47 is provided with a pivot-screw 51, terminating in a tapered point 52. A yoke 53 is provided with oppositely-disposed alined trunnions 54, which are provided in their outer ends with axially-disposed tapered openings 55. The trunnions 54 are disposed within openings 56, formed in the standard 47, and the tapered points 52 of pivot-screws 51 are disposed within tapered openings 55 in said trunnions. Between the trunnions 54 the yoke 53 is formed into a plane surface, upon which is disposed a sleeve 56, embracing a sight-tube 57. The yoke 53 is provided with a screw 58, passing through the plane portion and entering the yoke and serving to pivot the sleeve 56 upon the yoke and to secure the sight-tube 57 within the sleeve. Adjusting-screws 59 pass through the yoke 53 and bear upon opposite sides of sleeve 56, and screws 60 are passed through slots in the yoke 53 and into the sleeve 56, adapted to secure the sleeve 56 rigidly at any adjustment produced by the screws 59.

To one of the trunnions 54 a sector 61 is secured by means of a collar and screw 62. To the opposite trunnion 54 a lever 63 is secured by collar 64, embracing said trunnion and secured thereon by screw 65. The lever 63 is provided with an offset portion 64$^a$, adapted to pass within the opening of the upright 44, and is also provided with a spring 66, adapted to bear against the frame 44. A screw 67 passes through opening 68 in frame 44 and is disposed for contact with offset portion 64 of lever 63, said lever being held against the adjusting-screw 68 by the spring 66.

The operation of my improved surveying instrument is as follows: The ring 8, forming a universal joint by reason of the pivot-pins 9 and 14, permits the adjustment of the entire head of the instrument mounted upon socket member 11 by the manipulation of adjusting-screws 18. The graduated circle 39 may be rotated by loosening the cam 29 and lever 27, so that any mark upon the scale 40 may be brought to any desired point. The circle is then locked by the tightening of lever 27 against the flange 24 by turning the knurled head 30 and cam 29. The base 38, rigidly mounted upon spindle 13, may be rotated so that the vernier scale 41 will indicate a desired adjustment relative to scale 40. The vernier may then be locked at the desired adjustment by the tightening of screw 33, manipulated by knurled head 34. The spindle 13 may be adjusted to a nicety of fit by the adjusting-screw 31, which forms a bearing for the lower and smaller end of the spindle 13, and when the desired adjustment is attained the screw 31 is secured thereat by the lock-nut 32. The adjustment of the sight-tube 57 to a horizontal position or to an angle to the horizon is accomplished by the manipulation of screw 67 contacting with offset portion 64$^a$ of lever 63, the angle being indicated upon the sector 61 by the pointer. The vertical spider-web in the sight-tube may be adjusted to an exact vertical position by the manipulation of adjusting-screw 48, operated by nut 50 and locked in position by lock-nut 49, which will raise or lower either of the trunnions upon which the sight-tube is pivoted. A lateral adjustment of the sight-tube may be accomplished by the manipulation of adjusting-screws 51, having pivot-points engaging tapered openings 55 in trunnions 54, so that the trunnions 54 may be moved longitudinally of their axis within counterbored opening 56 in the standard 47. The axis of the sight-tube may be adjusted to an exact perpendicular to the axis of trunnions 54 by loosening screws 60 and moving the yoke 53 upon screw 58 as a pivot by the manipulation of screws 59, the said screws 60 moving in the slots of the yoke 53 and tightened when the desired adjustment is attained.

While I have shown and described the construction and operation of my improved surveying instrument at considerable length and detail as I have found the parts best adapted to coöperate to secure absolute nicety of adjustment, it is obvious that numerous minor changes may be made in the construction and details without departing from the spirit or scope of my invention.

Having thus described my invention, what I claim as novel, and desire to secure by Letters Patent, is—

1. In a surveying instrument, a tapered spindle, a tapered socket adapted to receive the spindle, a longitudinally-adjustable hollow bearing for the smaller end of the spindle and means passing through the hollow bearing whereby the spindle may be rigidly secured within the socket.

2. In a surveying instrument, a base-plate provided with an opening, a ring disposed loosely within the opening, pivot members passing through lugs on the base-plate and engaging the ring at diametrical points, a spindle-socket disposed loosely within the ring, pivot members passing through the ring, and provided with points engaging the socket, a tapered spindle disposed within the socket and a bearing for the end of the spindle capable of adjustment longitudinally of the spindle.

3. In a surveying instrument, a member having a substantially plane surface and provided with a tapered spindle-socket centrally disposed and axial thereto, a tapered spindle rotatably mounted in said socket, a graduated disk provided with a circumferential flange and mounted upon said spindle as a center and adjacent to and parallel with the plane surface and capable of rotary movement relative to the socket member, a lever pivoted to the socket member and capable of an angular movement to engage the flange of the disk, a cam eccentrically mounted and capable of moving the lever and means for rotating the cam.

4. In a surveying instrument, a rotatably-graduated circle, means for securing the circle at any desired rotary adjustment, a spindle rotatably mounted centrally to the circle and capable of independent rotary movement, a smaller graduated circle secured at its center to the spindle and mounted coaxial to the first circle, means for rigidly securing the two circles at any desired rotary adjustment relative to each other, a frame perpendicular to and rigid with the smaller circle and adapted to mount a sight-tube.

5. In a surveying instrument, an upright frame, bearings mounted on said frame and adapted for independent vertical adjustment, a sight-tube, a yoke adapted to embrace the sight-tube and provided with trunnions adapted to be pivoted in said bearings and means for producing a lateral adjusting movement of the sight-tube between the bearings.

6. In a surveying instrument, a base, a disk provided with a circumferential flange on one side, and rotatably mounted on said base, means adapted to engage said flange to hold the disk at any desired rotary adjustment, an annular upstanding rim upon the opposite face of said disk, a scale marked upon said rim and a vernier rotatably mounted adjacent to and concentric with said scale.

7. In a surveying instrument, a plate provided with a bearing, a spindle mounted in said bearing, a disk provided with a central opening and a circumferential flange upon each face and adapted to be mounted with the central opening about the spindle and with the lower flange encircling the plate, means for securing the disk at any desired rotary adjustment relative to the plate, a vernier rigidly secured to said spindle and mounted within the upper flange, scales marked upon the upper flange and the vernier, a frame rigidly secured to and upstanding from the vernier and a sight-tube mounted upon the frame.

8. In a surveying instrument a frame, bearings formed in said frame, a yoke provided with alined trunnions adapted to be pivotally mounted in said bearings, a sight-tube, a sleeve adapted to embrace the sight-tube and provided with means for connection with the yoke, and means for producing an angular adjustment of the sleeve relative to the yoke.

9. In a surveying instrument, a frame, bearings formed in said frame, a yoke provided with alined trunnions adapted to be pivotally mounted in said bearings and with a plane surface parallel with the axis of said trunnions, a sight-tube, a sleeve adapted to embrace the sight-tube and provided externally with a plane surface adapted to contact with the plane surface of the yoke, means for securing the two plane surfaces in pivotal engagement and means for adjusting the yoke to and securing it at a desired angular adjustment.

In testimony whereof I affix my signature in presence of two witnesses.

WINFIELD S. STOCKWELL.

Witnesses:
C. E. TANDY,
C. E. INGALLS.